(12) United States Patent
Langerfeld

(10) Patent No.: US 7,574,798 B2
(45) Date of Patent: Aug. 18, 2009

(54) METHOD FOR SOFT MACHINING OF BEVEL GEARS

(75) Inventor: Rolf Langerfeld, Hückeswagen (DE)

(73) Assignee: Klingelnberg GmbH, Hueckeswagen (DE)

(*) Notice: Subject to any disclaimer, the term of this patent is extended or adjusted under 35 U.S.C. 154(b) by 0 days.

(21) Appl. No.: 12/264,569

(22) Filed: Nov. 4, 2008

(65) Prior Publication Data
US 2009/0060671 A1  Mar. 5, 2009

Related U.S. Application Data

(62) Division of application No. 11/757,587, filed on Jun. 4, 2007, now Pat. No. 7,461,441.

(30) Foreign Application Priority Data
Jun. 6, 2006  (EP) .................. 06115040

(51) Int. Cl.
B23P 15/14 (2006.01)
(52) U.S. Cl. .......... 29/893.35; 409/40; 409/52; 409/51; 409/26; 409/27; 409/55
(58) Field of Classification Search .......... 409/55, 409/26, 25, 27, 28, 29, 30, 38, 40, 39, 51, 409/50, 52, 53, 54, 57; 29/893, 893.35, 893.3; 451/900, 47, 65, 69, 70
See application file for complete search history.

(56) References Cited

U.S. PATENT DOCUMENTS 5,007,151 A    4/1991  Gusching
6,336,777 B1 * 1/2002  Fisher et al. .................. 409/26
6,842,954 B2 * 1/2005  Ronneberger .................. 29/50
7,461,441 B2 * 12/2008  Langerfeld .................. 29/56.5

FOREIGN PATENT DOCUMENTS

| DE | 88 716 | 3/1972 |
| DE | 94 12 276 U1 | 10/1995 |
| DE | 101 24 779 A1 | 11/2001 |
| JP | 61 168420 | 7/1986 |

OTHER PUBLICATIONS

European Search Report of EP 06 11 5040.

* cited by examiner

*Primary Examiner*—Erica E Cadugan
(74) *Attorney, Agent, or Firm*—McCormick, Paulding & Huber LLP

(57) ABSTRACT

A device (10) for soft machining of bevel gears, having a receptacle (12) for receiving a bevel gear blank (K1) and having a tool spindle (13.1) for receiving a cutter head (13.2). The device comprises a machining arm (11) having a pivot axis (A1) which has the tool spindle (13.1) for receiving the cutter head (13.2) on a first side and has a tool spindle (14.1) for receiving an end-milling cutter (14.2) on a second side. A CNC controller (S) puts the end-milling cutter (14.2) into rapid rotation to cut a predefined number of tooth gaps on the bevel gear blank (K1). After the machining arm (11) is pivoted, the cutter head used as the bevel gear finishing tool (13.2) is used. It is put into slower rotation to machining the bevel gear blank (K1) using the bevel gear finishing tool (13.2) in a post-machining process.

5 Claims, 4 Drawing Sheets

METHOD FOR SOFT MACHINING OF BEVEL GEARS

CROSS REFERENCE TO RELATED APPLICATION

This application is a Divisional Application of U.S. application Ser. No. 11/757,587, now U.S. Pat. No. 7,461,441, filed Jun. 4, 2007 and claims the benefit of European Application No. 06 115 040.5, filed Jun. 6, 2006, the disclosures of which are herein incorporated by reference in their entirety.

BACKGROUND

1. Field of the Invention

The present invention relates to devices for soft machining bevel gears, in particular devices which are designed for dry machining. The present invention also relates to a corresponding method and a use of the device.

2. Prior Art

There are greatly varying machines which are used in the manufacturing of bevel gears and similar gears. For some time, there has been a demand for automating the manufacturing of even especially large-module bevel gears, as are used in ship or powerplant construction, for example.

One resulting problem is that such machines would not only become very complex and therefore costly, but rather also very large and awkward. In addition, the machining of a large-module bevel gear requires relatively great effort in the preparatory set up (equipping time). A costly machine would be idle during this time, which is disadvantageous from a financial viewpoint.

The present invention is therefore based on the object of simplifying the manufacturing of large bevel gears and, in addition, accelerating the manufacturing without having to accept quality losses.

A further object of the present invention comprises providing a method and a corresponding device which are designed for the cost-effective machining of large bevel gears.

SUMMARY OF THE INVENTION

These objects are achieved by the present invention. Accordingly, a method for soft machining of bevel gears has the following steps. A bevel gear blank to be machined is horizontally introduced into a device. An end-milling cutter used as a pre-gear cutting tool is fed by executing a relative movement between the bevel gear blank and a machining arm. The arm has a first tool spindle for receiving a cutter head used as a bevel gear finishing tool on a first side and a second tool spindle for receiving the end-milling cutter used as the pre-gear cutting tool on a second side. The bevel gear blank is pre-machined using the end-milling cutter, by putting the cutter into rapid rotation and plunging the cutter into the bevel gear blank in a generating movement to cut a predefined number of tooth gaps in the bevel gear blank in the approximate position and having approximate dimensions. Pivoting the machining arm and executing a relative feed movement brings the cutter head into a starting position. Post-machining of the bevel gear blank uses the cutter head, by putting the cutter head into a slower rotation and machining the bevel gear blank by a rolling movement.

In accordance with another aspect of the invention, a method for soft machining of bevel gears has the following steps. A bevel gear blank to be machined is horizontally introduced into a device. An end-milling cutter used as a pre-gear cutting tool is fed by executing a relative movement between the bevel gear blank and a machining arm. The arm has a first tool spindle for receiving a cutter head used as a bevel gear finishing tool on a first side and a second tool spindle for receiving the end-milling cutter used as the pre-gear cutting tool on a second side. The bevel gear blank is pre-machined using the end-milling cutter, by putting the cutter into rapid rotation and plunging the cutter into the bevel gear blank in a generating movement to cut a predefined number of tooth gaps in the bevel gear blank in the approximate position and having approximate dimensions. Pivoting the machining arm and executing a relative feed movement brings the cutter head into a starting position. Post-machining of the bevel gear blank uses the cutter head, by putting the cutter head into a slower rotation and machining the bevel gear blank by a rolling movement.

Further advantageous embodiments are further described hereafter.

The method according to the present invention is designed especially for machining tooth flanks before a hardening process, i.e., in the soft state. The tools which are used are to be selected accordingly.

The present invention may also be used for machining other gears, of course, although the device is especially designed for large-module bevel gears (preferably having a module greater than 12) and is particularly cost-effective for this special use.

BRIEF DESCRIPTION OF THE DRAWINGS

Exemplary embodiments of the present invention are described in greater detail in the following with reference to the drawings. It shows FIG. 1 a scheme for the machining of gearwheels according to the present invention, FIG. 2 a schematic, exemplary side view of a first device according to the present invention.

DETAILED DESCRIPTION OF THE PREFERRED EMBODIMENTS

Terms are used in connection with the present description which are also used in relevant publications and patents. However, it is to be noted that the use of these terms is solely for better understanding. The ideas according to the present invention and the scope of protection of the patent claims are not to be restricted in their interpretation by the specific selection of the terms. The present invention may be transferred without further measures to other term systems and/or professional fields. The terms are to be applied accordingly in other professional fields.

The present invention is concerned with the machining of large-module bevel gears. According to the definition, this term also comprises crown wheels and bevel pinions. Bevel gears without axial offset and bevel gears with axial offset, so-called hypoid gears, are also included. However, the present invention primarily relates to the production of crown wheels or bevel pinions having large gearing. Crown wheels or bevel pinions of this type have a diameter which is greater than 1 meter and may be up to 3 meters, for example. The gearing may have a tooth height of up to 100 mm or more.

The present invention is based on the following findings. There are various aspects which provide a contribution to the cost-effectiveness of the machining of large bevel gears. The overall handling and the set up (orientation and chucking) on a machine is very complex (time-consuming) because of the size and weight of the workpiece. Experiments have shown that up to 2 hours must be planned for this procedure. This results in longer unproductive phases of the machine, which in turn has an influence on the cost-effectiveness of the overall operation.

Until now, large gearings of this type have been machined wet, i.e., lubricant and/or coolant is supplied during the machining. The use of the corresponding liquids is increasingly undesirable, however, and the apparatus outlay for supplying and removing the liquid is not negligible. The requirement of being able to produce even large gearings using dry machining thus results. However, a significant point of wear is the cutter heads which have typically been used until now. These cutter heads comprise a main body which is equipped with multiple cutters (such as form or bar blades), which must be very exactly conditioned and whose position in the cutter head must be set very precisely. If the cutters are worn, the cutter head must be uninstalled and the cutters are reground or replaced by new ones. Only then is the cutter head used again. This also contributes to the fact that a transfer of previous approaches to "dry" would not be cost-effective.

The present invention builds on these points, as explained in greater detail in the following.

Figure 1:
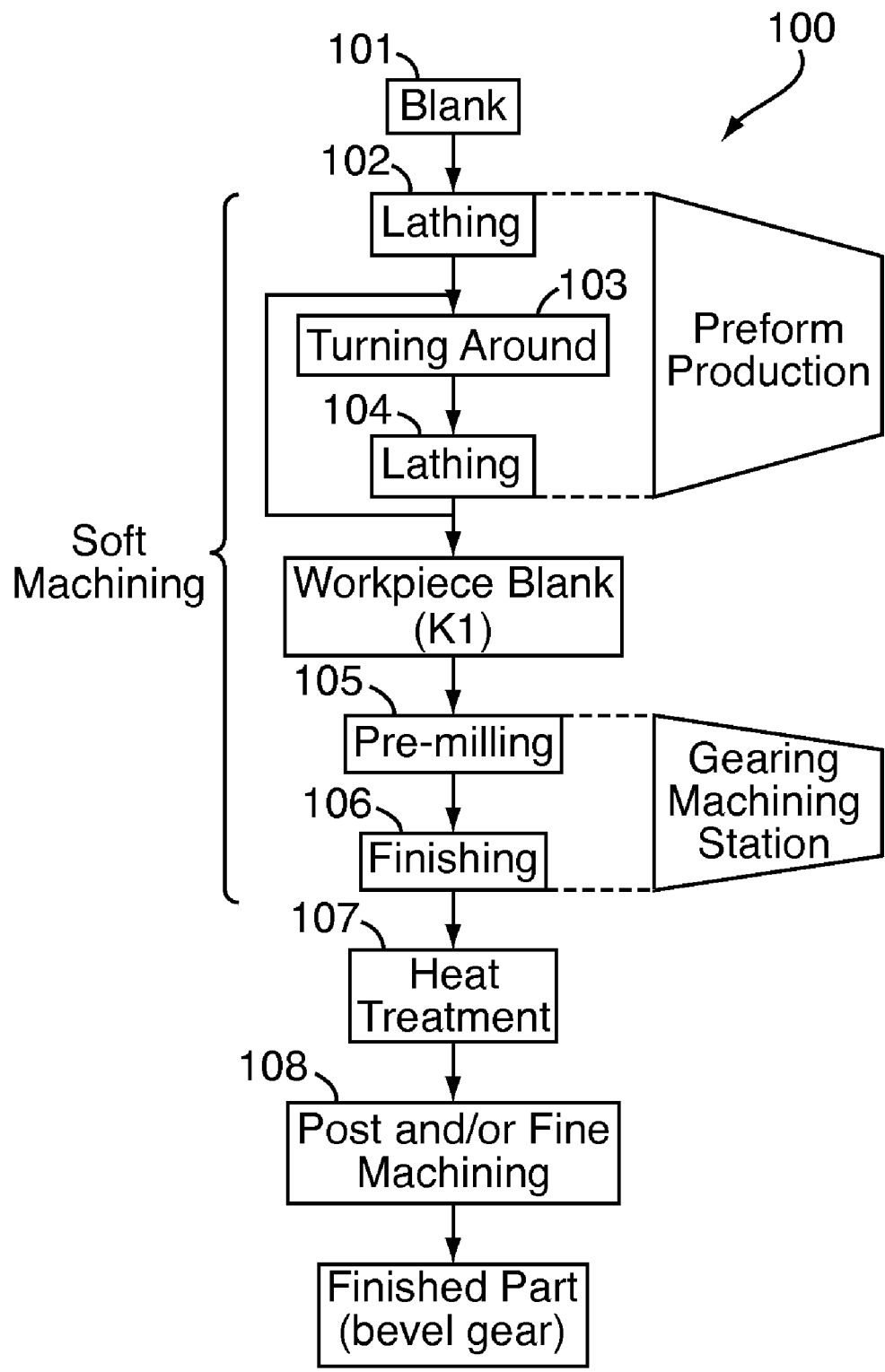

FIG. 1 shows a schematic illustration of an exemplary method sequence 100. The invention may advantageously be used in the context shown. As noted, this is an example of the machining of a large-module crown wheel or bevel pinion. Starting from a blank (box 101), the following soft machining steps are performed in the example shown. For example, a (central) hole may be produced by lathe machining (box 102). The blank may then be turned around for further machining (box 103). After the turning around, renewed lathe machining may follow (box 104). These steps are optional and are referred to in the present context as preform production. Other steps or alternative steps may also be executed in the scope of the preform production. At the end of the preform production, the workpiece is referred to as a wheel blank or workpiece blank K1. Step 102 or steps 102-104 may be executed in a so-called pre-machining machine or in multiple different machines, for example.

The so-called gear cutting now follows. According to the present invention, (dry) bevel gear milling (box 105) is used as the method to mill a predefined number of tooth gaps on the bevel gear blank K1 in the approximate position and having the approximate dimensions in the scope of a pre-machining process using an end-milling cutter 14.2 (see FIG. 2, for example). The step identified by 105 is also referred to here as (bevel gear) pre-milling. This is followed by the step of (bevel gear) finishing (box 106), which is executed according to the present invention using a bevel gear finishing tool 13.2 and which gives the tooth gaps, or the adjoining tooth flanks, the desired shape having the predefined precision by finish machining.

Steps 105 and 106 are executed according to the present invention in the same machine 10. The workpiece blank K1 thus does not have to be rechucked or transferred.

A heat treatment (box 107) typically subsequently follows. This heat treatment is typically no longer included in the soft machining. It is used for the purpose of hardening the workpiece blank K1. Optional post-machining and/or fine machining may then follow (box 108). Thus, for example, bearing seats may be ground or hard-turned and/or hard machining of the gearing may be performed. The large-module bevel gear is then finished.

Further details of the present invention are described in the following on the basis of a more precise description of an exemplary embodiment of a corresponding machine 10 and its use.

Figure 2:
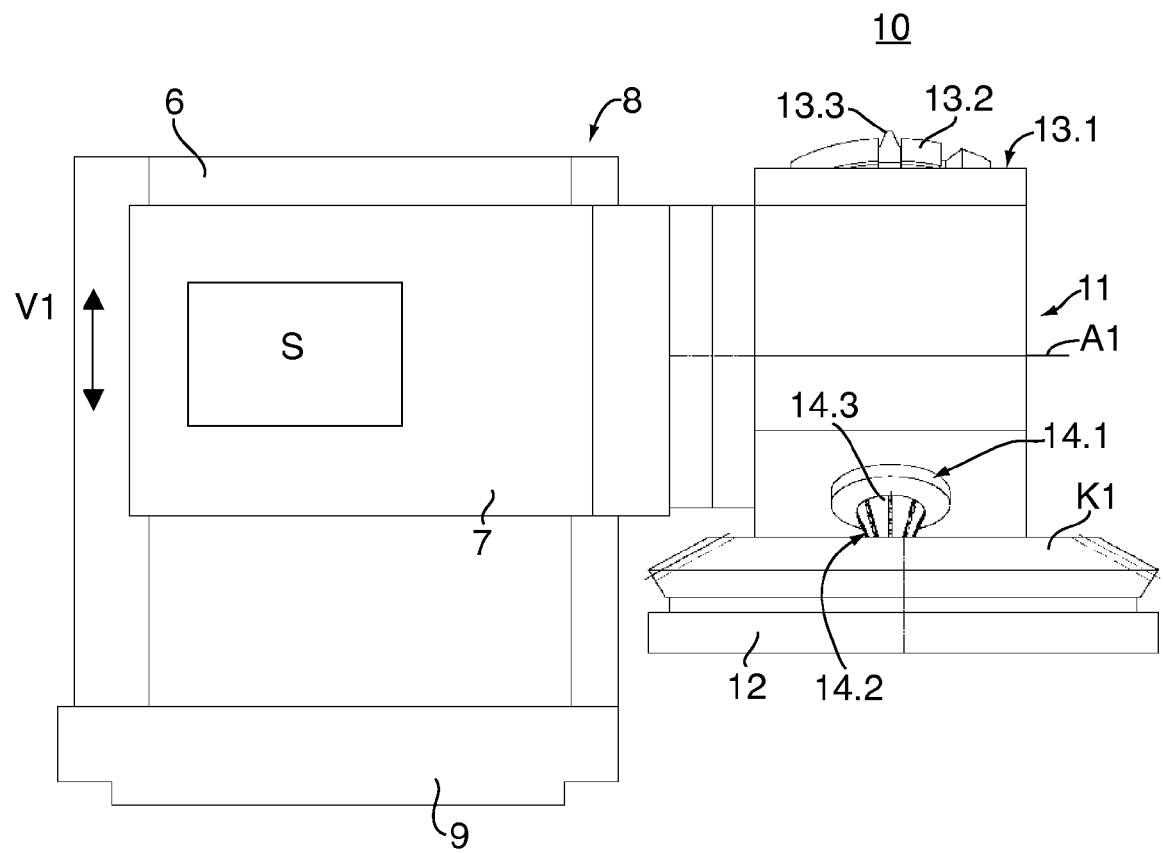
Figure 3:
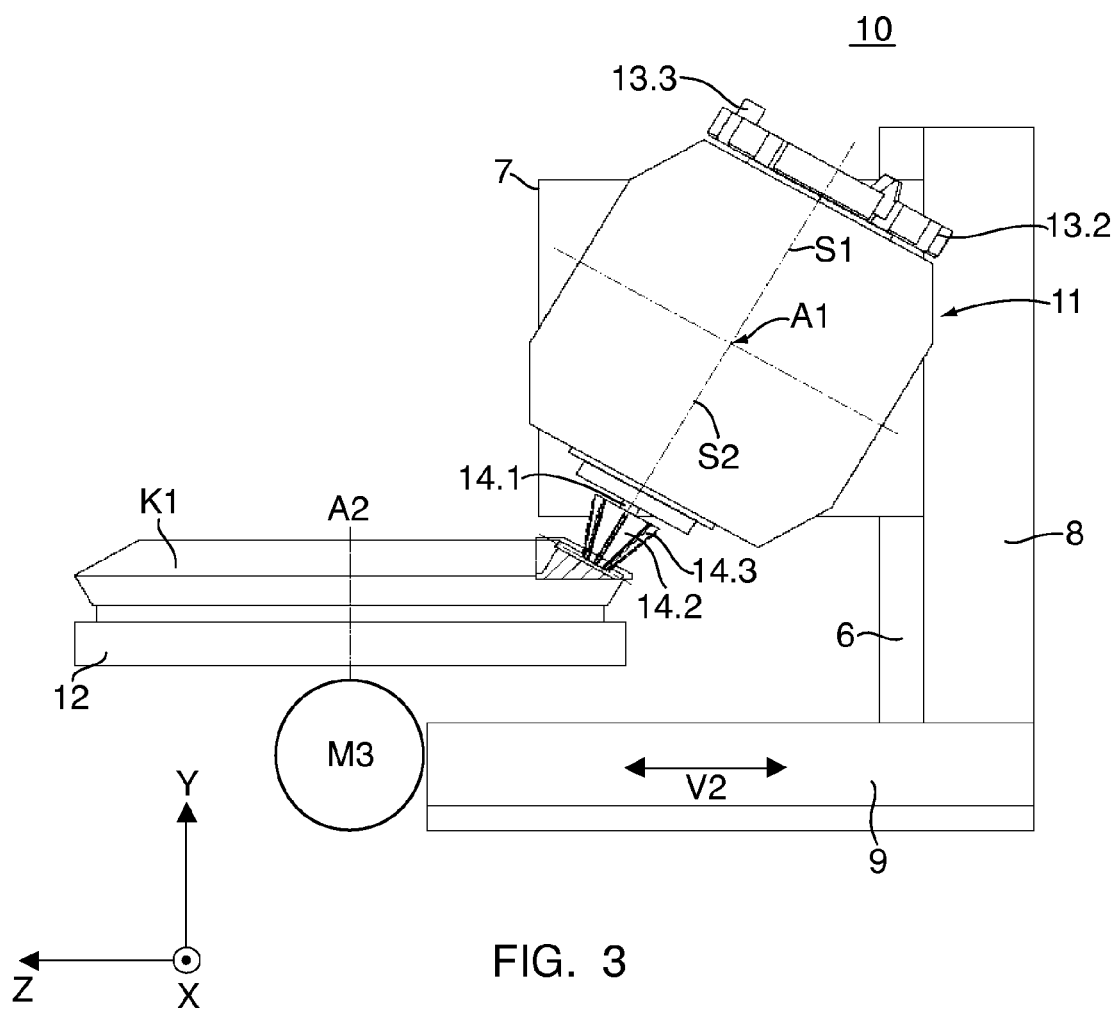
FIG. 3 a schematic view of a further side of the first device.
Figure 4:
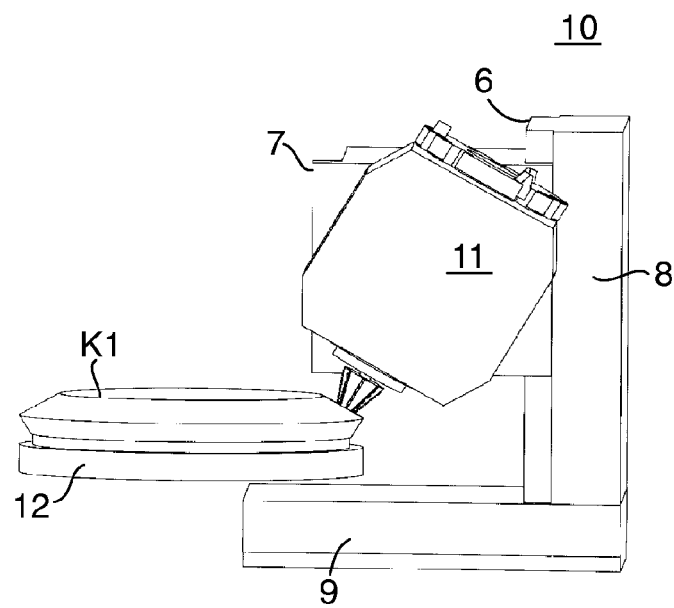
FIG. 4 a schematic perspective view of the first device.
Figure 5:
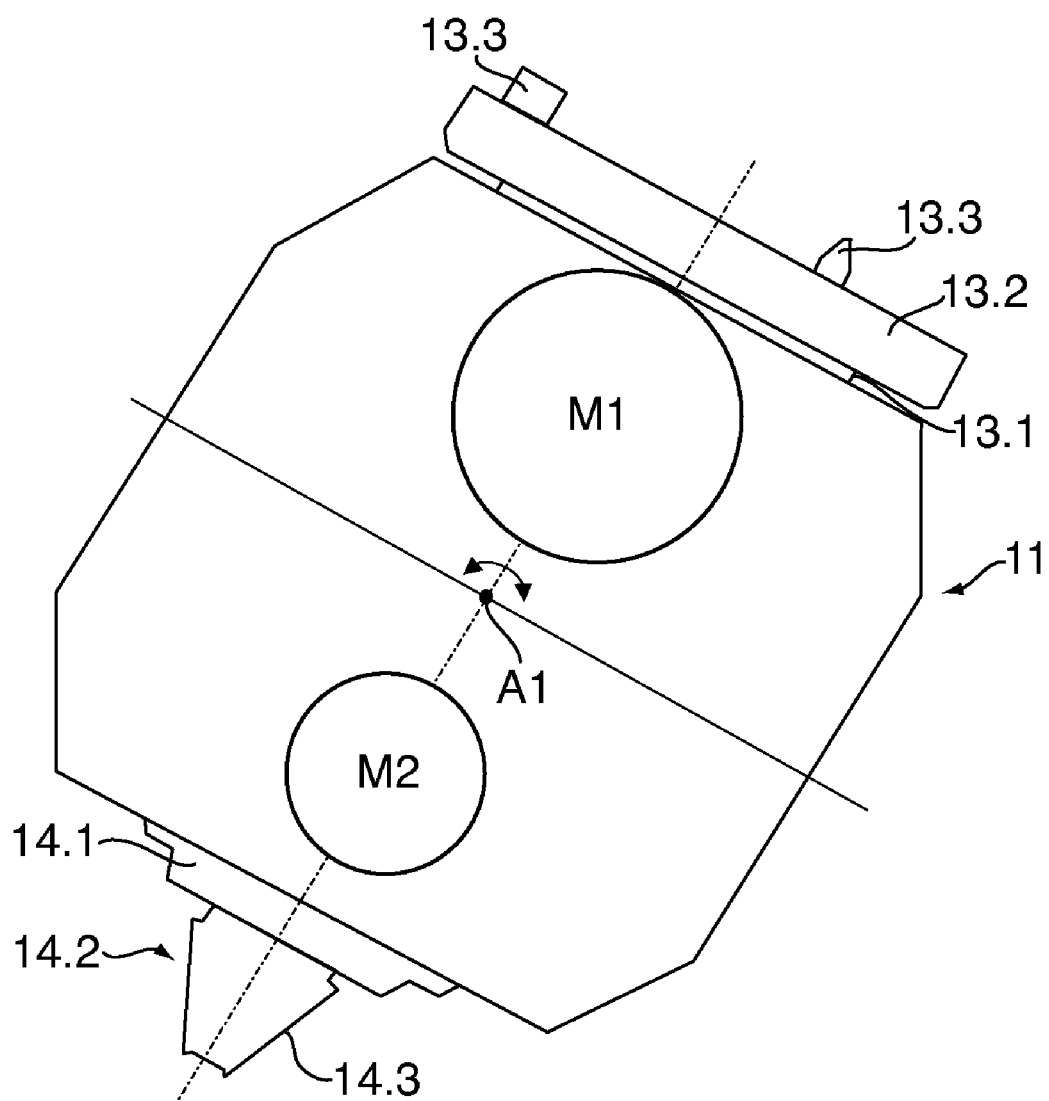
FIG. 5 a schematic view of the machining arm of the first device.

Various views of a machine 10 according to the present invention are shown in FIGS. 2, 3, and 4 and a schematic portion of the machine is shown FIG. 5. As may be seen from the figures, the machine 10 has a vertically standing machine part 8 having a vertically running guide 6 (or alternatively having multiple guides). A machine part 7 is attached laterally to the housing 8, which is displaceable upward and downward (i.e., parallel to the y axis) along the guide(s) 6, as indicated by the double arrow V1. The machine part 8 is in turn seated on a horizontal machine bed 9 and may be displaced along this machine bed 9 in the z direction, as indicated by the double arrow V2. The machine part 7 carries a machining arm 11, which may be pivoted around a pivot axis A1. This pivot axis A1 is in the plane of the drawing in FIG. 2, i.e., it runs parallel to the x axis. The bevel gear blank K1 to be machined lies flat (i.e., horizontally in the x-z plane) below the machining arm 11 on or in a receptacle 12 (for example, in the form of a spindle or a spindle table), whose rotational axis A2 runs parallel to the y axis.

According to the present invention, the machine 10 is thus a vertically or diagonally operating machine (depending on the position of the machining arm 11), in which, during the gear cutting, the workpiece spindle having the gear blank K1 is situated below the workpiece spindle having the gear cutting tool 13.2 or 14.2.

Preferably, both the receptacle 12 and also the machine bed 9 are seated on a shared machine platform or foundation, which is not shown in the figures, however.

A first workpiece spindle 13.1 for receiving a cutter head 13.2 used as a bevel gear finishing tool is provided on the machining arm 11 on a first side. A second workpiece spindle 14.1 for receiving an end-milling cutter 14.2 used as a gear cutting tool is attached on a second side of the machining arm 11. In the illustration of FIG. 2, the end-milling cutter 14.2 is shown before the pre-milling of the bevel gear blank K1, while the cutter head 13.2 points upward and is not used.

According to the present invention, the machining arm 11 has a slow first drive M1, which is designed for larger torques, and a fast second drive M2, which is designed for smaller torques, as schematically indicated in FIG. 5 on the basis of two circles. These drives M1 and M2 comprise motors which are preferably seated in the machining arm 11, and possibly step-up or reduction gears. It is also possible to house a part of the drives in another location of the machine 10 and to conduct the rotational movement into the machining arm 11 and from there onto the spindles 13.1 and 14.1 using shafts.

The entire configuration is designed in such a way that the first tool spindle 13.1 may be driven by the first drive M1 and the second tool spindle 14.1 may be driven by the second drive, normally either one or the other drive functioning.

Alternatively, a single motor may also be provided, which drives the two spindles 13.1 and 14.1 alternately, the required speed being provided by corresponding drive trains.

According to the present invention, the bevel gear finishing tool is preferably driven at a speed of less than 100 rpm and the end-milling cutter is driven at a speed between 800 and 2500 rpm.

The machine 10 comprises a CNC controller S, as schematically indicated in FIG. 2, or the machine 10 is connected to an external CNC controller S. The CNC controller S is programmed in such a way that it controls the individual movement sequences according to the present invention. The end-milling cutter 14.2 is set into rapid rotation using the second drive M2 by the CNC controller S and the machine axes are moved in such a way (referred to as a feed movement) that the end-milling cutter 14.2 plunges into the workpiece blank K1 and machines the bevel gear blank K1 using the end-milling cutter 14.2 in a generating pre-machining process. A three-dimensional relative movement between end-milling cutter 14.2 and workpiece blank K1 is executed in such a way that a predefined number of tooth gaps having predefined shape are cut and/or milled on the bevel gear blank K1 in the approximate position and having approximate dimensions.

During this pre-machining process, between 50% and 95% of the material in the area of tooth gaps to be manufactured is milled away on the bevel gear blank K1 using the end-milling cutter 14.2, before the post-machining process begins. This is thus coarse or broaching machining. Because this is not precise manufacturing of the tooth gaps, but rather only pre-machining, it is therefore also not especially critical if the end-milling cutter 14.2 displays certain appearances of wear, because it has little or no influence on the subsequent post-machining process.

It is seen as an essential advantage of the present invention that the end-milling cutter 14.2 does not have to meet especially high requirements. In most cases, a standard end-milling cutter or a suitable variation may be used, which is relatively cost-effective. If the end-milling cutter 14.2 is worn, it may be replaced with little handling. For this purpose, the spindle 14.1 preferably has a rapid chucking device. The construction of the machine 10 even allows the replacement of the end-milling cutter 14.2 to be performed during the finishing using the tool 13.2.

The end-milling cutter 14.2 preferably has a conical or trapezoidal cross-section in one axial plane, as is shown, for example, in FIG. 4. End-milling cutters 14.2 made of hard metal are especially preferred. The end-milling cutter 14.2 may have one or more cutting edges 14.3. Multiple such cutting edges are recognizable in FIG. 3. Furthermore, it may be seen from the figures that the end-milling cutter 14.2 has a significantly smaller diameter than the cutter head 13.2 used as the bevel gear finishing tool. Preferably, the diameter of the end-milling cutter 14.2 is less than 20% of the diameter of the cutter head 13.1. It is to be noted that the end-milling cutter 14.2 must be smaller than the gaps which it generates.

Preferably, bevel gear finishing tools having a diameter between 500 and 1300 mm are used, while the end-milling cutter may typically have circumference at the lower cone end between 10 and 25 mm and at the upper cone end between 80 and 100 mm.

The end-milling cutter is preferably guided only on a path which approximately corresponds to the gap and thus generates a tooth profile corresponding to its shape. The final profile of the teeth is generated by the finishing using the cutter head. Depending on the embodiment, the bevel gear blank K1 may easily rotate around the workpiece axis A2 during the pre-machining of each tooth gap, or the bevel gear blank K1 may rest during the pre-machining of each tooth gap. Upon the jump to the next tooth gap to be manufactured, the bevel gear blank K1 always makes a so-called indexing rotational movement around the workpiece axis A2.

To be able to rotate the bevel gear blank K1 continuously or step-by-step, a workpiece drive M3 is provided, which allows a controlled rotation around the workpiece axis A2. The corresponding drive M3 is schematically illustrated in FIG. 3.

The second tool used in the same machine 10 is, as already noted, a cutter head 13.2 used as a bevel gear finishing tool. This cutter head 13.2 is equipped with multiple cutters 13.3, which are shaped and situated in such a way that they execute finish machining upon plunging into the workpiece blank K1 having pre-finished tooth gaps. During the finish machining, the cutter head 13.2 makes a rotational movement around the spindle axis S1 and, in addition, the bevel gear blank K1 also makes a rotating movement around the workpiece axis A2. There is thus a generating roll movement between the cutting edges of the cutter 13.3 and the bevel gear blank K1. Finishing may also be performed in the continuous or single-indexing method.

The cutters 13.3 of the cutter head 13.2 are preferably oriented axially to the cutter head 13.2 (i.e., they lie parallel to the spindle axis S1), as shown in FIG. 5, for example.

According to the present invention, tools made of high-performance steel, hard metal, ceramic, or cermet (combination of metal and ceramic), each having a suitable hard material coating, are used for machining the bevel gear gearing depending on the application.

The actions or movement sequences described above are coordinated by the cited CNC controller S.

It is an advantage of the present invention that the tool costs per finished bevel gear are significantly more reasonable than in typical methods for producing large gearings. A further advantage is that the novel construction of the machine 10, having the configuration of the two tools 13.2 and 14.2 on a shared machining arm 11, makes it possible to machine even especially large bevel gears, because the arm 11 may be moved above the horizontally lying bevel gear without problems.

The embodiment described and shown is a 6-axis machine 10, which allows relative movements in multiple directions. The following movements are possible: (lateral) displacement V1, (horizontal) displacement V2, pivot movement around A1, rotation of the first tool 13.2 around the spindle axis S1, rotation of the second tool 14.2 around the spindle axis S2, and rotation of the workpiece K1 around the axis A2.

In an alternative embodiment, one or both movements may be executed in the y-z plane and in the x-z plane by displacing the bevel gear blank K1. Displaceability V1 or V2 is no longer necessary in this case.

The various axes are numerically controlled axes. The individual movements may thus be numerically controlled by the CNC controller S. Preferably, the controller S is designed in such a way that all axes are numerically controlled. It is important that individual movement sequences occur in a coordinated way. This coordination is performed by the CNC controller S.

Further similar embodiments are obtained by appropriate adaptation of the individual elements essential to the present invention.

The horizontal position of the bevel gear to be machined is also advantageous. There are no longer radially directed forces due to this type of configuration (at least as long as no forces are exerted on the bevel gear by tools), which represent a problem with vertical chucking for large masses in particular. According to the present invention, forces only act in the axial direction, i.e., parallel to the axis A2. In addition, the position of the various numerically controlled axes is selected in such a way that the largest possible movement freedom results for the processing of the workpiece K1.

In addition, the heavy and large bevel gear blank K1 may be supplied and removed without problems using a crane or another lifting means.

Using an end-milling cutter 14.2 is advantageous, because such cutters are intended especially for operating in solid material, i.e., in other words, to be used for coarse or broaching machining.

In addition, end-milling cutters 14.2, which are simple to maintain, may be used. It is also simpler and more cost-effective to implement a high-speed drive M2 for an end-milling cutter 14.2 having small diameter than a corresponding high-speed drive for a large and heavy cutter head 13.2. Furthermore, as noted, the tool change is simpler and faster. In addition, the forces which act on the machine 10 during the coarse machining are significantly less.

The invention claimed is:

1. Method for soft machining of bevel gears having the following steps:

introduction of a bevel gear blank to be machined into a device, feeding an end-milling cutter used as a pre-gear cutting tool by executing a relative movement between the bevel gear blank and a machining arm of the device, which arm has a first tool spindle for receiving a cutter head used as a bevel gear finishing tool on a first side of the arm and a second tool spindle for receiving the end-milling cutter used as the pre-gear cutting tool on a second side of the arm, pre-machining of the bevel gear blank using the end-milling cutter, by putting it into rapid rotation and plunging it into the bevel gear blank in a generating movement to cut a predefined number of tooth gaps on the bevel gear blank in an approximate desired position and having approximate desired dimensions, pivoting the machining arm and executing a relative feed movement to bring the cutter head into a starting position, post-machining of the bevel gear blank using the cutter head, the cutter head being put into a slow rotation and machining the bevel gear blank by a rolling movement.

2. The method according to claim 1, characterized in that the bevel gear blank is mounted on or in a receptacle.

3. The method according to claim 1, characterized in that the end-milling cutter is disengaged and removed when it is worn or must be replaced by another, this being performed while the cutter head is used.

4. The method according to claim 1, characterized in that, during the pre-machining of the bevel gear blank using the end-milling cutter, either the bevel gear blank is rotated around an axis or the bevel gear blank rests at the moment of machining.

5. The method according to claim 1, characterized in that the bevel gear blank is rotated around an axis during the post-machining of the bevel gear blank using the cutter head, and the rolling movement results therefrom.

* * * * *